United States Patent [19]
Harter

[11] 3,744,901
[45] July 10, 1973

[54] PHOTOGRAPHIC SPOT MONITOR APPARATUS
[75] Inventor: James E. Harter, Webster, N.Y.
[73] Assignee: Eastman Kodak Company, Rochester, N.Y.
[22] Filed: Oct. 7, 1971
[21] Appl. No.: 187,481

[52] U.S. Cl. .................................... 355/38, 355/68
[51] Int. Cl. ............................................ G03b 27/78
[58] Field of Search ................................ 355/38, 68

[56] References Cited
UNITED STATES PATENTS

| | | | |
|---|---|---|---|
| 3,011,396 | 12/1961 | Szymczak | 355/68 X |
| 3,554,642 | 1/1971 | Zahn | 355/38 |
| 3,170,022 | 2/1965 | Reesen | 355/38 X |
| 3,170,367 | 2/1965 | Wick | 335/68 X |
| 3,222,983 | 12/1965 | Ouchi | 355/68 X |
| 3,588,246 | 6/1971 | July | 355/38 |

Primary Examiner—Samuel S. Matthews
Assistant Examiner—E. M. Bero
Attorney—W. H. J. Kline

[57] ABSTRACT

Photographic spot monitor apparatus includes a plurality of spot rings adapted to be selectively positioned in the near focal plane of a film transparency to thereby project the image of the ring onto the print plane defining the area being monitored. The monitoring apparatus positioned adjacent the optical axis of the printer, intercepts oblique light emanating through the spot ring from the film transparency and divides the light so intercepted into its basic color components to facilitate analysis of the color content of the transparency. The monitoring apparatus also includes a plurality of stops corresponding to said plurality of spot rings, each of said stops being selected for use with its corresponding ring.

6 Claims, 4 Drawing Figures

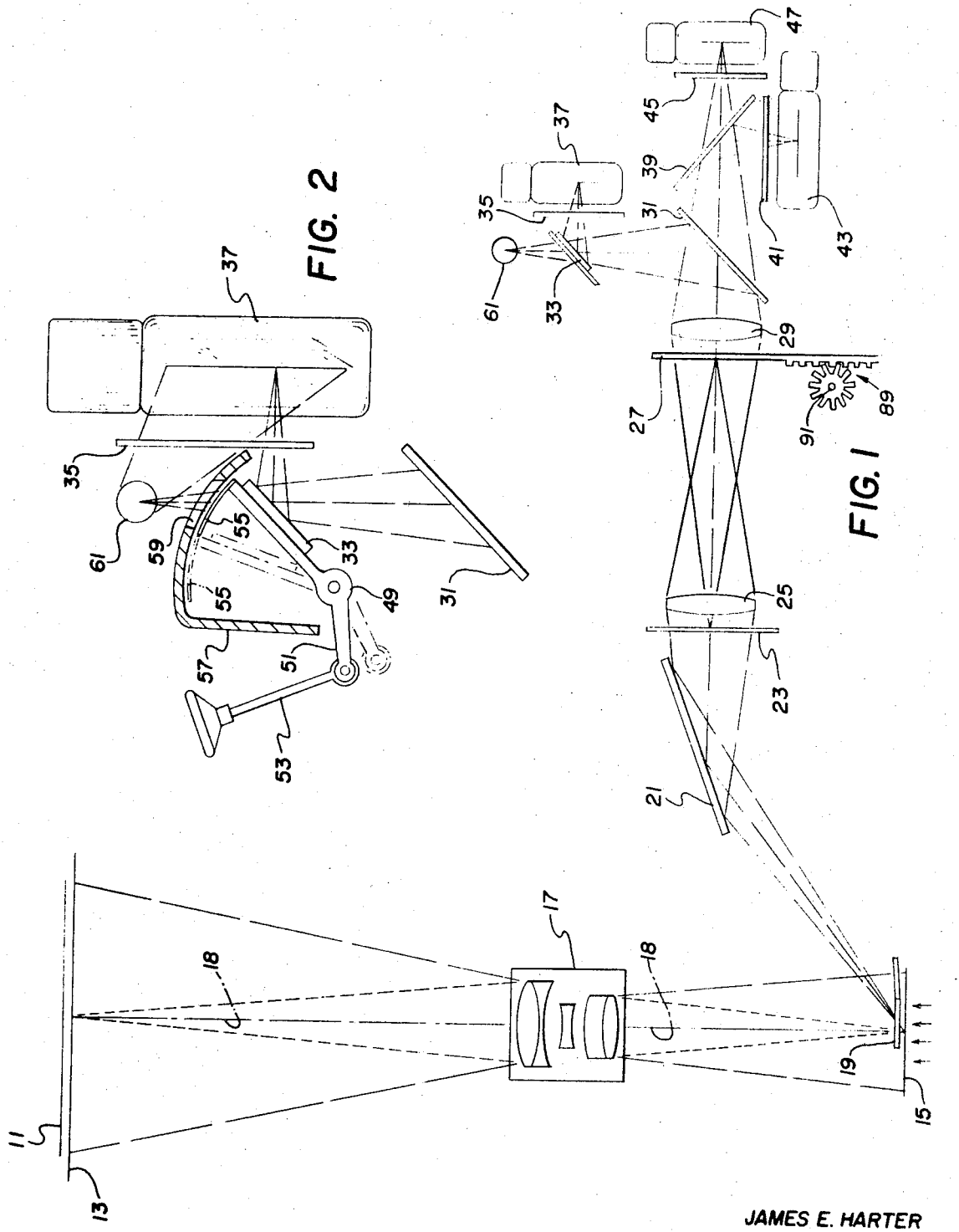

PATENTED JUL 10 1973  3,744,901
SHEET 2 OF 2
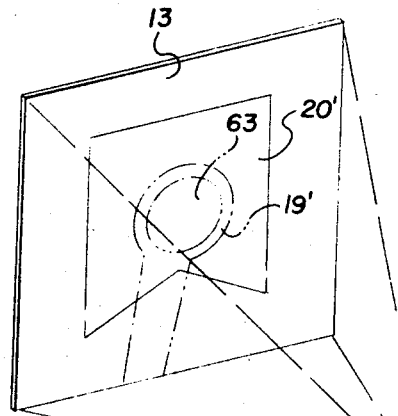
FIG. 3
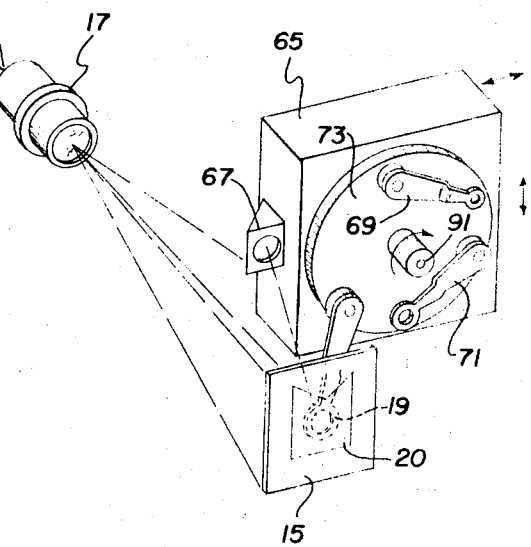
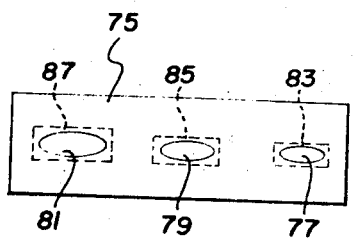
FIG. 4
JAMES E. HARTER
INVENTOR.
BY Cyril A. Krenzer
W.H.J. Kline
ATTORNEYS

PHOTOGRAPHIC SPOT MONITOR APPARATUS

BACKGROUND OF THE INVENTION

This invention relates generally to photographic printing apparatus, and more particularly to improved spot monitoring apparatus for use with a color photographic printer.

In connection with the enlarging of color or black and white film, it is highly desirable to determine the density for color film and the content of the transparency prior to printing. By so evaluating the transparency, it is possible to determine the proper corrective filters and exposure time, for example, necessary to achieve the best printing results.

There are available systems in apparatus which pre-read the film transparencies, for example, on a densitometer or color negative analyzer, prior to printing and which provide a readout or indication of the necessary corrective action to be taken on the print apparatus. However, this approach is time consuming and requires that special markings and instructions accompany the film transparency to the printer apparatus, so the printer operator can make the necessary corrections. The apparatus so used must also be compatible with the printing apparatus to be used to enlarge the film.

Other enlarger systems may use monitoring apparatus to analyze light reflected from the print plane or light detected in the print plane. The technique of using light reflected from the print plane can introduce error, depending upon the relative reflective characteristics of the screen or composing surface in the print plane. While introducing a light probe directly into the print plane does not experience this difficulty, it very often distorts the image and makes it difficult for the operator to get a true evaluation of the area of the print being monitored.

In evaluating a color transparency in a projected image to determine the best corrective measures to be taken, it is necessary that the monitoring apparatus accurately define that portion of the image being monitored. For example, in portrait photography it is often highly desirable to utilize the flesh tones to determine the proper settings for the exposure. In this case it is highly important that the monitor be accurately located in the chosen flesh tone area, and furthermore that only light emanating from that area impinge upon the monitoring apparatus. It is also desirable in such situations to have available various sizes of spots for monitoring the selected area of the film transparency.

OBJECTS AND SUMMARY OF THE INVENTION

Accordingly, it is a principal object of the invention to provide an improved monitoring apparatus which accurately defines the area of a film being monitored.

Another object of the invention is to provide improved monitoring apparatus which give a visual indication of the area of the transparency being monitored.

Yet another object of the invention is to provide monitoring apparatus which permits variations in the size of the area of the transparency being monitored.

A further object of the invention is to provide improved monitoring apparatus which permits verification of the monitor alignment.

The foregoing and other objects are accomplished according to one aspect of the invention which utilizes a plurality of spot rings selectively adapted to be moved into the focal plane of the transparency, so that both the image and the ring are projected onto a composing screen. Detection apparatus is obliquely mounted in the system and constructed so that only the light passing through the spot in the focal plane of the transparency passes to the monitoring apparatus, where it is divided into the red, green and blue color components for evaluation. For each spot ring size, there is a corresponding aperture in the detecting apparatus to assure that only the light from within the spot is monitored. The different size rings have associated therewith suitable neutral density filters to compensate for the varying amount of light that will be passed therethrough depending upon the size of the spot ring being used.

DESCRIPTION OF THE DRAWINGS

FIG. 1 is a diagrammatic sectional illustration of a photographic printer incorporating monitoring apparatus according to the present invention;

FIG. 2 is an expanded sectional illustration of a portion of the monitoring apparatus of FIG. 1;

FIG. 3 is a perspective view of the apparatus according to the present invention; and FIG. 4 is a diagrammatic illustration of the various aperture slide 27 used within the monitoring apparatus of FIG. 1.

DESCRIPTION OF THE PREFERRED EMBODIMENT

Referring first to FIG. 1, the projection system includes the print plane 11 with a composing screen 13 positioned in front of it. A film transparency 15 is located in the negative focal plane and between the film transparency and the print plane is the printing lens cluster 17 all positioned along the projection axis 18. Immediately in front of the negative focal plane, and essentially located therein, is a spot monitor ring 19, which is associated with the spot monitoring apparatus, as will become evident from the following description. Located to the side of the projection axis 18 is a first surface mirror 21, which directs the light toward a rectangular aperture stop 23 and through a field lens 25. Light from the field lens passes through a field stop 27 located in the primary image plane, through the objective lens 29 and impinges on a first dichroic mirror 31. Light reflected from the dichroic mirror 31 impinges on a surface mirror 33 and is reflected through a filter 35 onto the cathode of a photo multiplier tube 37. Light passing through the dichroic mirror 31 impinges on a second dichroic mirror 39, the reflected light from which passes through a filter 41 onto the cathode of a second photo multiplier tube 43. Light passing through the dichroic mirror 39 passes through a filter 45 onto the cathode of a third photo multiplier tube 47.

In operation, oblique light emanating from a discrete area of the negative defined by the ring 19 is reflected by the surface mirror 21 and passes through the rectangular aperture stop 23 and is collected by the field lens 25. The light therefrom is directed onto a field stop 27, which as will become apparent later, has an opening related to the size of the opening in the spot ring 19. The field stop may also have associated with it a neutral density filter to compensate for the total amount of light passing therethrough. Light from the field stop passes through the object lens and a first color component thereof is reflected by the dichroic mirror 31 to the reflecting mirror 33 to impinge on the cathode of photo multiplier tube 37 after passing through the filter 35. In a particular embodiment this first color reflected would be red, in which case the filter 35 would be in a red filter. In addition then, the dichroic 31 would pass the blue and green color components, which upon striking on the dichroic 39 would have the blue light reflected and the green light transmitted, so that the blue light would pass through the blue filter 41 onto the cathode photo multiplier tube 43. The transmitted green light passes through a green filter 45 onto its respective photo multiplier tube cathode 47. The light detected by the respective photo multiplier tubes 37, 43 and 47 would excite the tubes and give an output proportional to the respective color content of the light emanating through the ring 19. Using standard analytical circuitry, such as that associated with an electronic color viewer, for example as disclosed in U.S. Pat. No. 3,351,707, the outputs from the photo multiplier tubes are used to generate the necessary information to determine the corrective filtering, exposure times, etc. necessary to produce the desired color print.

Referring next to FIG. 2, there is shown an expanded view of the red light detection portion of the monitoring apparatus with additional components providing the capability for back-projection of light to give an indication of spot alignment. The mirror 33 is mounted on a pivotable plate 49, which is connected by a pivotably mounted arm 51 to a plunger actuator 53. Attached to one end of the plate 49 is a light seal 55. Behind the mirror and plate is a light baffle 57 having a window 59 opening therein. Behind the window is a lamp 61. With the apparatus as shown by the solid lines, the spot monitor functions in the same manner as described in connection with FIG. 1. However, when the plunger actuator 53 is moved downward, the plate 49 with the light seal 55 attached to one thereof is moved upwardly so that light from the lamp 61 is incident upon the reflective dichroic mirror 31, and this light will be back-projected through the apparatus of FIG. 1 onto the ring defined area of the film transparency being monitored. As will be readily apparent to those skilled in the art, the optics of the system are such that if the ring is in proper alignment, the light back-reflected from the lamp 61 through the system onto the film transparency would be in direct alignment with the ring 19.

As seen in FIG. 3, a negative 15 having an image 20 thereon is projected through the printing lens 17 onto the composing screen 13. The image 20' on the composing screen is, of course, reversed from that of the film transparency 15. The spot ring 19 located in the near focal plane of the film transparency 15 is also projected onto the composing screen 13 as an image 19', thereby defining accurately the area 63 of the film transparency being monitored. The apparatus described in conjunction with the monitors of FIGS. 1 and 2 might be located in the "black box" 65 positioned to the side to intercept oblique rays emanating from the spot ring 19. The rays pass through an opening 67 which would contain the surface mirror 21. As illustrated, the monitor 65 is capable of motion in both the horizontal and vertical directions to permit positioning of the spot ring in the desired area of the transparency. Alternately, the monitor could be mounted to provide rotational motion combined with either horizontal or vertical movement to effect the same positioning capability.

The monitor has mounted on the back side thereof three spot rings 19, 69 and 71 of varying sizes. They are preferably pivotably mounted on a rotatable plate 73 to permit selection of the desired spot size. To accommodate a system having, for example, three spot ring sizes, the field stop 27 would be required to have therein three openings 77, 79 and 81 (see FIG. 4). The field stop slide 75 would be suitably connected, for instance, through a gearing mechanism 89 to shaft 91 of the rotatable plate 73 of FIG. 3, so that the proper stop aperture would be located in the light path depending upon the particular spot ring chosen for monitoring. Positioned behind each of the spot apertures would be suitable neutral density filters 83, 85 and 87 respectively, in order to compensate for the varying amounts of incident light that would impinge upon the dichroic mirrors of the apparatus due to the area differences in the spot sizes.

As can be seen in FIG. 4, the stop apertures 77, 79 and 81 are of an elliptical configuration because of the oblique angle at which the light is detected coming from the negative area defined by the spot ring. Of course, the stop apertures 77, 79 and 81 also configure the back projection from the lamp 61 of FIG. 2 during the spot verification and each is respectively operative through the optics of the system to produce a circular spot over the ring in the negative plane 15.

Therefore, while the invention has been described in detail with particular reference to preferred embodiments thereof, it will be understood that variations and modifications can be effected within the spirit and scope of the invention.

I claim:

1. In photographic printing apparatus including a print plane, means for supporting an image bearing film in an object plane, a printing lens suitably positioned between said print plane and said object plane to focus an image of film supported by said film supporting means through the lens onto the print plane and means for illuminating film supported by said film supporting means for projection through the lens along a projection axis onto the print plane, improved monitoring apparatus comprising:

spot ring apparatus, including at least one ring adapted to be movably positioned immediately adjacent the object plane of said film supporting means whereby projection of the image of film supported by said film supporting means onto the print plane includes projection of an image of said ring onto said print plane to define the area being monitored;

a field lens located with respect to said image bearing film so as to be off the projection axis yet receive light therefrom for forming an image of film supported by said film supporting means in a primary image plane;

stop means located in said primary image plane to restrict light passage to that light passing through said ring; and light detecting means for receiving light transmitted from said field lens through the stop means to thereby monitor the ring defined portion of the object plane.

2. The invention according to claim 1 wherein said spot ring apparatus includes a plurality of rings of different size; said stop means includes a plurality of stops corresponding, respectively, to said plurality of rings;

and further including means responsive to the selection of one of said rings being positioned adjacent said object plane to move the corresponding stop into position in said primary image plane.

3. The invention according to claim 1 further including an objective positioned between said primary image plane and said light detecting means.

4. The invention according to claim 1 additionally comprising a secondary illumination source adapted to be projected through said stop means and said field lens onto said image bearing film, whereby coincidence of the light so projected with said spot ring is indicative of proper alignment of the apparatus, verifying that said light detecting means is monitoring the area of the object film within said ring.

5. The invention according to claim 1, wherein said light detecting means comprises:
   a plurality of photo detectors;
   a plurality of color selective filters, one positioned proximate each of said photo detectors; and
   light splitting means adapted to split the incident light into a plurality of components of white light and direct said plurality of components of white light onto a respective one of said plurality of photo detectors.

6. The invention according to claim 2 wherein each of said stop means has positioned adjacent thereto a neutral density filter adapted to compensate for brightness variations resulting from the area differences of each of said plurality of stop means.

* * * * *